US005486952A

United States Patent [19]

Nagao et al.

[11] Patent Number: 5,486,952

[45] Date of Patent: Jan. 23, 1996

[54] DEVICE FOR DRIVING AN EC ANTIGLARE MIRROR

[75] Inventors: Mitsuyoshi Nagao; Hidenori Sato; Michiaki Hattori, all of Fujieda, Japan

[73] Assignee: Murakami Kaimeido Co., Ltd., Japan

[21] Appl. No.: 418,062

[22] Filed: Apr. 6, 1995

[30] Foreign Application Priority Data

Apr. 13, 1994 [JP] Japan .................................... 6-099291

[51] Int. Cl.[6] ............................ G02B 27/00; G02B 5/08; G02F 1/15; G01J 1/20

[52] U.S. Cl. .......................... 359/603; 359/601; 359/604; 359/265; 359/267; 359/884; 250/214 AL; 250/205

[58] Field of Search .................................... 359/603, 601, 359/265, 267, 884, 885, 604; 250/214 AL, 205, 201.1, 214 LS

[56] References Cited

U.S. PATENT DOCUMENTS

| | | | |
|---|---|---|---|
| 4,676,601 | 6/1987 | Itoh et al. | 359/603 |
| 4,793,690 | 12/1988 | Gahan et al. | 359/604 |
| 4,886,960 | 12/1989 | Molyneux et al. | 250/206 |
| 4,896,030 | 1/1990 | Miyaji | 250/201 |
| 5,148,014 | 9/1992 | Lynam et al. | 250/214 AL |
| 5,285,060 | 2/1994 | Larson et al. | 250/214 AL |

*Primary Examiner*—Paul M. Dzierzynski
*Assistant Examiner*—Mohammad Y. Sikder
*Attorney, Agent, or Firm*—Hedman, Gibson & Costigan

[57] ABSTRACT

In a device for driving an EC antiglare mirror in which reflectivity is variably controlled by an EC element, a surrounding light quantity detection circuit detects quantity of light surrounding a vehicle. A rear light quantity detection circuit detects quantity of light in the rear of the vehicle. An oscillation circuit is constructed so that duration of an "H" level of an oscillation signal and duration of an "L" level of the oscillation signal are individually controlled. An inversion period control circuit variably controls duration of one of the "H" and "L" levels of the oscillation signal generated by the oscillation circuit in response to light quantity detected by the surrounding light quantity detection circuit and also variably controls duration of the other level in response to light quantity detected by the rear light quantity detection circuit. An EC element drive circuit inverts, in accordance with the level of the oscillation signal, the polarity of drive voltage supplied from a drive power source and applies the inverted voltage to the EC element and thereby controls the amount of coloration in accordance with duty factor of the oscillation signal.

5 Claims, 8 Drawing Sheets

10
SURROUNDING LIGHT QUANTITY DETECTION
12
REAR LIGHT QUANTITY DETECTION
16
INVERSION PERIOD CONTROL
14
OSCILLATION
OSCILLATION SIGNAL
24
EC ELEMENT DRIVE
20
EC ELEMENT
22
DRIVE POWER SOURCE

COLOR IMPARTING
COLOR FADING
20
24
Q1
Q2
R7
R6
R10
R11
R8
R9
C4
32
16
16a
16b
SW1
R1
D1
10:CdS
R2
R3
D2
12:CdS
R4
30
R5
C1
14
OUT
+1.6V POWER SOURCE
26
IN
OUT
-1.6V POWER SOURCE
28
IN
22
SURROUNDING LIGHT
REAR LIGHT ( : COLOR FADING ENERGY

: COLOR IMPARTING ENERGY )

DEVICE FOR DRIVING AN EC ANTIGLARE MIRROR

BACKGROUND OF THE INVENTION

This invention relates to a device for driving an EC (electrochromic) antiglare mirror used as an inside or outside rear view mirror.

An EC antiglare mirror is made by covering the front surface of the reflecting surface of a mirror with an EC element film and achieves an antiglare effect against light from headlights of a succeeding vehicle while running at night by changing the amount of coloration of the EC element and thereby controlling reflectivity of the mirror. For obtaining such antiglare effect, the antiglare mirror is so controlled that, upon detection of quantity of incident light from the rear, the amount of coloration increases (i.e., reflectivity decreases) when the light from the rear is strong whereas the amount of coloration decreases ( the color fades, i.e., reflectivity increases) when the light from the rear is weak.

The glare of the light to the human eye, however, is produced by entire surrounding light and, therefore, the control based on the light from the rear only does not match the human sense. For this reason, a control is generally made in such a manner that not only rear light but also surrounding light is detected and color imparting and color fading controls are made in accordance with quantity of the detected rear and surrounding light. More specifically, when surrounding light is strong, the glare of the light is not so strong notwithstanding that there is rear light. In this case, the sensitivity of detection for the rear light is reduced for making it harder for the EC element to be colored. When the surrounding light is weak, the glare of the light to the rear light is strong and, in this case, sensitivity of detection for the rear light is raised for making it easier for the EC element to be colored. In the prior art EC antiglare mirror, surrounding light and rear light are detected and a value of voltage applied to the EC element is obtained in accordance with a combination of the surrounding light and the rear light and the amount of coloration, i.e., reflectivity, is controlled by this voltage.

This prior art method, however, requires a structure for combining detected values of the surrounding light and the rear light and obtaining a control amount of a single object of control.

It is an object of the invention to provide a device for driving an EC antiglare mirror which has overcome the above described problem of the prior art method and enables control of the amount of coloration by controlling the surrounding light and the rear light individually as separate objects of control and thereby realizes a simplified structure of the device.

SUMMARY OF THE INVENTION

For achieving the object of the invention, a device for driving an EC antiglare mirror in which reflectivity is variably controlled by an EC element comprises surrounding light quantity detection means for detecting quantity of light surrounding a vehicle, rear light quantity detection means for detecting quantity of light in the rear of the vehicle, oscillation means for generating an oscillation signal of an "H" level and an oscillation signal of an "L" level repeatedly and alternately, said oscillation means being capable of individually controlling duration of the "H" level and duration of the "L" level, inversion period control means for variably controlling duration of one of the "H" and "L" levels of the oscillation signal generated by said oscillation means in response to light quantity detected by said surrounding light quantity detection means and variably controlling duration of the other of the "H" and "L" levels of the oscillation signal in response to light quantity detected by said rear light quantity detection means, a drive power source for driving the EC element, and EC element drive means for inverting the polarity of drive voltage supplied from the drive power source in response to the "H" or "L" level of the oscillation signal generated by said oscillation means and applying the inverted drive voltage to the EC element, said inversion period control means performs control, when said EC element drive means is so see that it drives the EC element in a color imparting direction at the one level of the oscillation signal and in a color fading direction at the other level of the oscillation signal, in such a manner that, when the surrounding light quantity is larger, the duration of the one level is shorter and, when the surrounding light quantity is smaller, the duration of the one level is longer and that, when the rear light quantity is larger, the duration of the other level is shorter and, when the rear light quantity is smaller, the duration of the other level is larger and, when said EC element drive means is so set that it drives the EC element in a color fading direction at the one level of the oscillation signal and in a color imparting direction at the other level of the oscillation signal, in such a manner that, when the surrounding light quantity is larger, the duration of the one level is longer and, when the surrounding light quantity is smaller, the duration of the one level is shorter and that, when the rear light quantity is larger, the duration of the other level is longer and, when the rear light quantity is smaller, the duration of the other level is shorter.

According to the invention, the degree of coloration is controlled by controlling duration of one level of the oscillation signal in accordance with the surrounding light quantity and controlling duration of the other level of the oscillation signal in accordance with the rear light quantity, and changing the duty factor of the oscillation signal. Since it is sufficient in the invention to control each individual object of control for the surrounding light and the rear light, a structure for combining detected values of the surrounding light and the rear light is no longer required, so that the structure of the device can be simplified.

In one aspect of the invention, a device for driving an EC antiglare mirror in which reflectivity is variably controlled by an EC element comprises oscillation means comprising first inversion period control means including a first photoconductive cell which receives light surrounding a vehicle and decreases its value of resistance in response to quantity of the surrounding light, first resistance and a first diode connected in series to the first photoconductive cell, and second resistance connected in parallel to the first photoconductive cell, and second inversion period control means including a second photoconductive cell which receives light in the rear of the vehicle and decreases its value of resistance in response to quantity of the rear light, third resistance and a second diode having a direction reverse to the first diode connected in series to the second photoconductive cell, and fourth resistance connected in parallel to the second photoconductive cell, said first inversion period control means and said second inversion period control means being arranged in parallel in a feedback loop, and, when the value of resistance of the first photoconductive cell decreases, duration of one of "H" and "L" levels of oscillation signals is shortened whereas, when the value of resistance of the second photoconductive cell decreases, duration of the other level of oscillation signals is shortened, a drive power source for driving the EC element, an EC element drive switching circuit which inverts the polarity of drive voltage supplied from the drive power in accordance with the "H" or "L" level of the oscillation signal generated by the oscillation means and applies the inverted voltage to the EC element, said switching circuit applying voltage of a color imparting direction when the oscillation signal is at the one level and applying voltage of a color fading direction when the oscillation signal is at the other level.

According to this aspect of the invention, control of duration of one level of the oscillation signal in accordance with the surrounding light quantity is made by the first inversion period control means and control of duration of the other level of the oscillation signal in accordance with the rear light quantity is made by the second inversion period control means. When the surrounding light is strong, the first and third resistances which are connected in series to the first and second photoconductive cells make coloration harder even when the rear light is strong. When the surrounding light is very weak, the second and fourth resistances which are connected in parallel to the first and second photoconductive cells prevent coloration which might otherwise occur due to very weak rear light.

In another aspect of the invention, a device for driving an EC antiglare mirror described above has a further feature that the EC element drive switching circuit comprises a switching element and the device further comprises an energy supply restricting element which is connected in series to the switching element for restricting supply of driving energy to the EC element.

According to this aspect of the invention, since the energy supply restricting element is provided in series to the switching element, supply of energy to the EC element is restricted and consumption of electricity thereby is reduced and heating of the device can be prevented. Further, abrupt change in both color imparting direction and color fading direction can be prevented and too frequent repetition of coloration and color fading can also be prevented.

In another aspect of the invention, a device for driving an EC antiglare mirror described above has a further feature that the oscillation period of the oscillation means is 10 ms or below.

According to this aspect of the invention, the glare of the light can be prevented more effectively by limiting the oscillation frequency to 10 ms or below.

In still another aspect of the invention, a device for driving an EC antiglare mirror as described above has a further feature that it further comprises oscillation stop means for stopping oscillation of the oscillation means through an outside operation to fix an output level of the oscillation means to a level at which the voltage of a color fading direction is applied to the EC element.

According to this feature of the invention, oscillation is stopped through an outside operation and color fading can thereby be made compulsorily.

A preferred embodiment of the invention will be described below with reference to the accompanying drawings.

BRIEF DESCRIPTION OF THE DRAWINGS

In the accompanying drawings.

DESCRIPTION OF A PREFERRED EMBODIMENT

Figure 1:
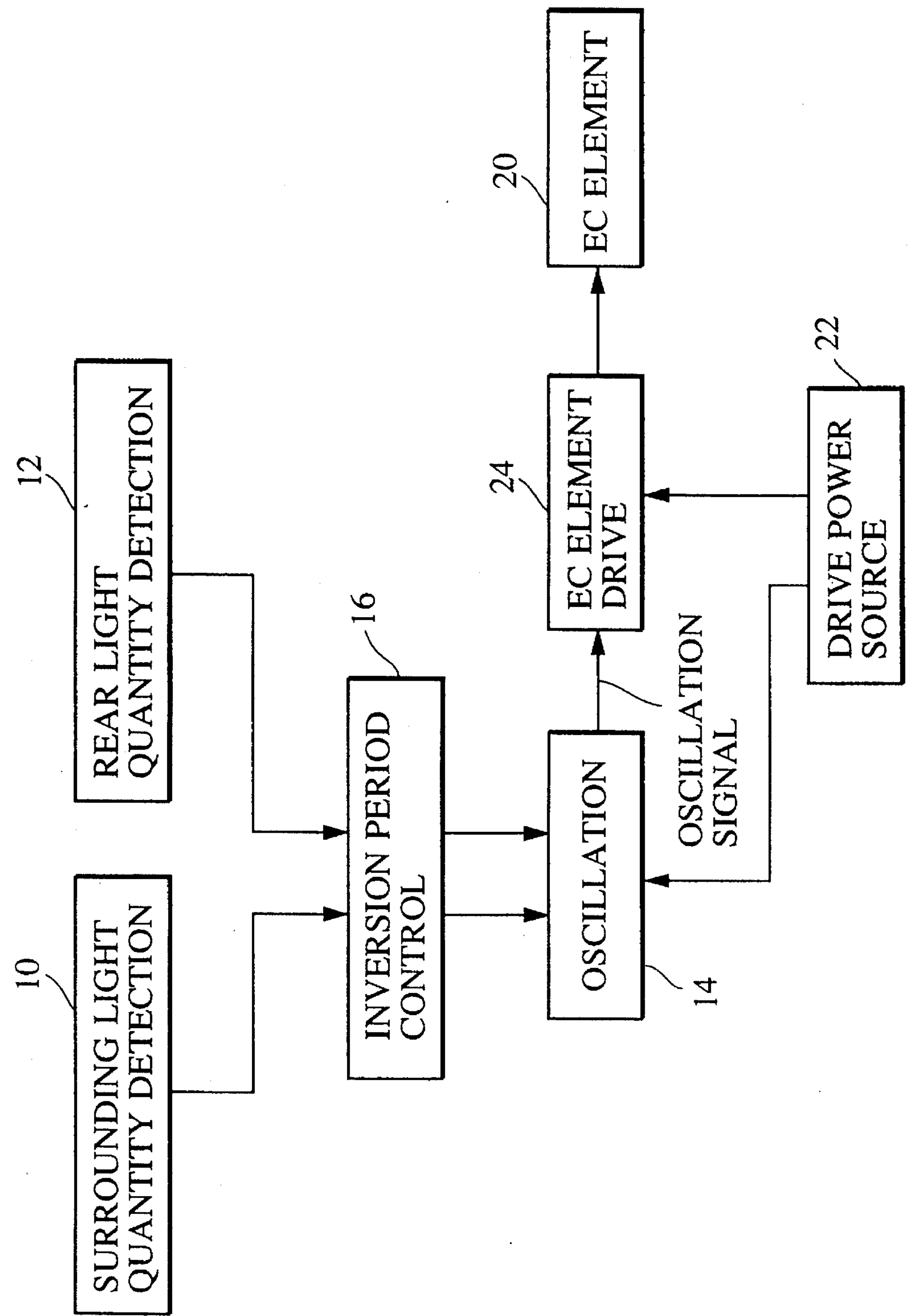
FIG. 1 is a block diagram showing an embodiment of the invention.

FIG. 1 shows an embodiment of the invention. A surrounding light quantity detection circuit 10 detects quantity of light surrounding a vehicle and is disposed in a mirror housing of, for example, an inside rear view mirror or an outside rear view mirror facing forward of the vehicle. Rear light quantity detection circuit 12 detects quantity of light from the rear of the vehicle and is disposed in the mirror housing facing rearward of the vehicle.

An oscillation circuit 14 generates oscillation signals of an "H" level and an "L" level alternately and repeatedly. The oscillation circuit 14 is so constructed that duration of the "H" level and duration of the "L" level can be individually controlled. Oscillation period of the oscillation circuit 14 should preferably be 10 ms or below for concealing the glare of the light in fading and imparting of color from the human eye. An inversion period control circuit 16 variably controls duration of one of the "H" and "L" levels of the oscillation signals generated by the oscillation circuit 14 in response to the light quantity detected by the surrounding light quantity detection circuit 10. The inversion period control circuit 15 variably controls duration of the other of the "H" and "L" levels of the oscillation signals generated by the oscillation circuit 14 in response to the light quantity detected by the rear light quantity detection circuit 12.

An EC element 20 is formed as a film on the front surface of the reflecting surface of the mirror. A drive power source 22 supplies a drive power to the oscillation circuit 14 and the EC element 20. An EC element drive circuit 24 inverts the polarity of the drive voltage supplied from the drive power source 22 and applies the inverted voltage to the EC element 20, thereby controlling the amount of coloration in accordance with duty factor of the oscillation signal.

The control of duty factor by the inversion period control circuit 16 is as follows:

The inversion period control circuit 16 performs control, when the EC element drive circuit 24 is so set that it drives the EC element 20 in a color imparting direction at the one level of the oscillation signal and in a color fading direction at the other level of the oscillation signal, in such a manner that, when the surrounding light quantity is larger, the duration of the one level is shorter and, when the surrounding light quantity is smaller, the duration of the one level is longer and that, when the rear light quantity is larger, the duration of the other level is shorter and, when the rear light quantity is smaller, the duration of the other level is larger and, when the EC element drive circuit 24 is so set that it drives the EC element 20 in a color fading direction at the one level of the oscillation signal and in a color imparting direction at the other level of the oscillation signal, in such a manner that, when the surrounding light quantity is larger, the duration of the one level is longer and, when the surrounding light quantity is smaller, the duration of the one level is shorter and that, when the rear light quantity is larger, the duration of the other level is longer and, when the rear light quantity is smaller, the duration of the other level is shorter.

By this control, the amount of coloration is continuously controlled. That is, when the surrounding light is weak, sensitivity to the rear light increases and the amount of coloration increases with increase of the rear light quantity so that reflectivity drops and an antiglare state is realized. When the surrounding light is strong, sensitivity to the rear light decreases with resulting increase in difficulty in coloration and maintenance of a high reflectivity.

Figure 2:
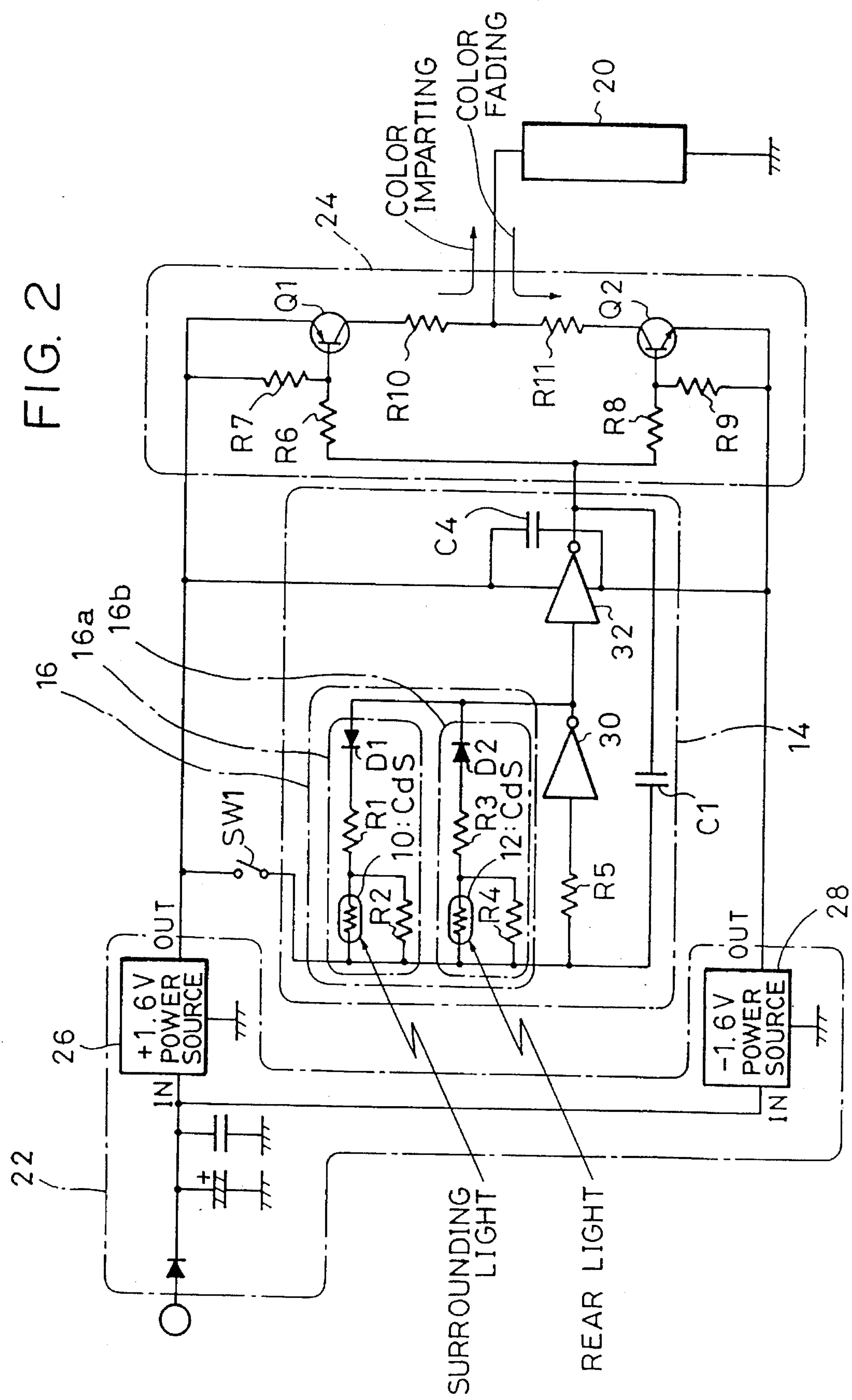
FIG. 2 is circuit diagram showing a specific example of the circuit of FIG. 1.
Figure 3A:
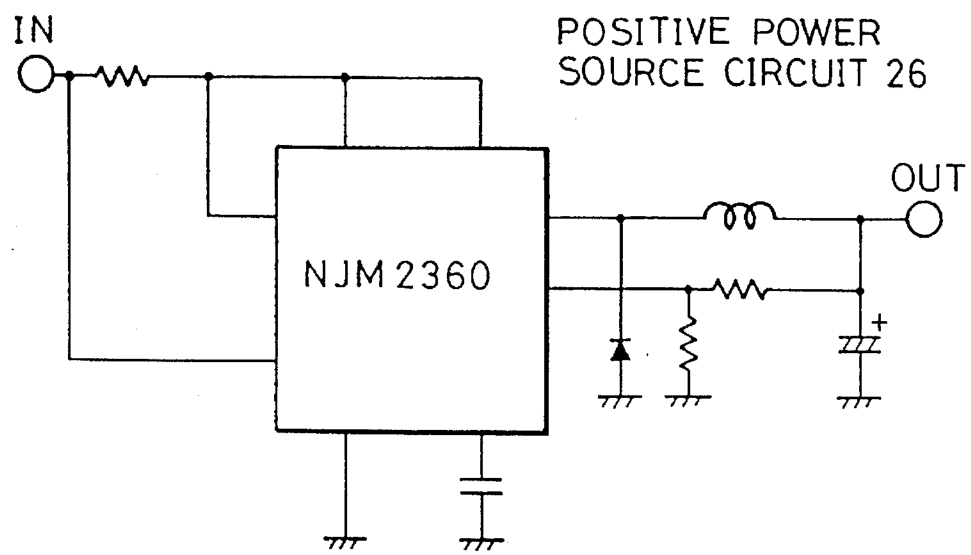
FIGS. 3A and 3B are circuit diagrams showing specific examples of a positive power source circuit 26 and a negative power source circuit 28.
Figure 3B:
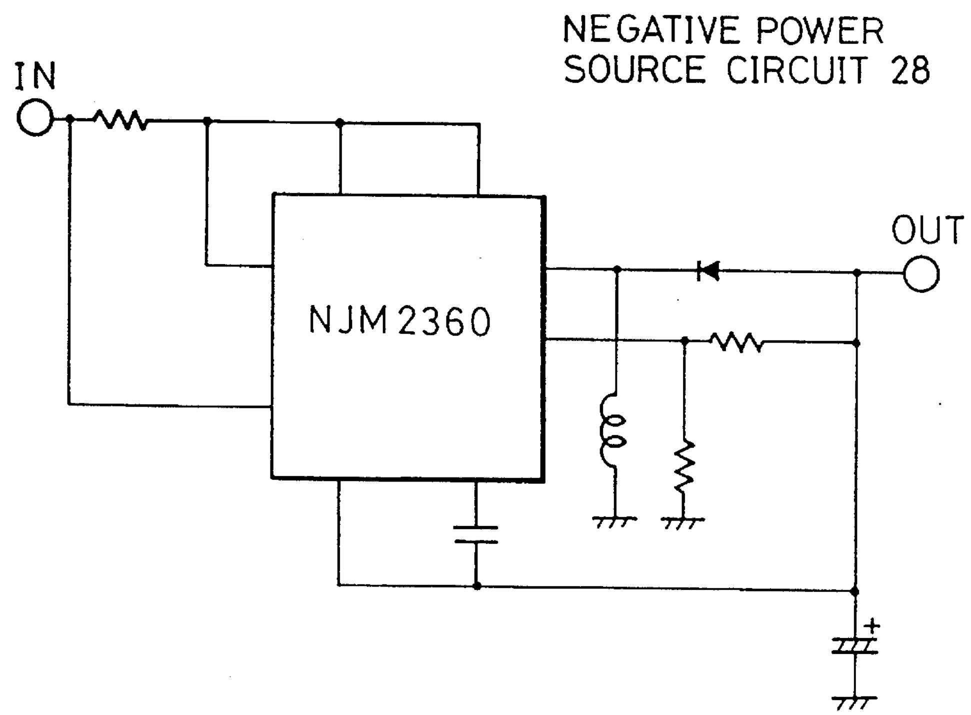

A specific example of the device for driving the EC antiglare mirror is shown in FIG. 2. In FIG. 2, components corresponding to those of FIG. 1 are designated by the same reference characters. In this circuit, it is assumed that an "L" level of an oscillation signal generated by the oscillation circuit 14 constitutes the one level and an "H" level constitutes the other level and that the one level is used for driving in the color imparting direction and the other level is used for driving in the color fading direction. A drive power source 22 receives dc voltage of +12V from a battery and converts it to dc voltage of about +1.6V by a positive power source circuit 26 and also to dc voltage of about −1.6V by a negative power source circuit 28. By constructing these positive and negative power source circuits 26 and 28 with a switching power source, a power source circuit which is efficient and space saving when it is incorporated in the mirror housing and which generates little heat can be realized. Specific examples of the positive and negative power source circuits 26 and 28 constructed of a switching power source are respectively shown in FIGS. 3A and 3B. The positive power source circuit 26 of FIG. 3A is constructed of a switching type step-down converter using NJM2360 (made by JRC) as an integral circuit. The negative power source circuit 28 is constructed of a switching type polarity inversion converter using NJM2360 as an integral circuit.

Figure 4A:
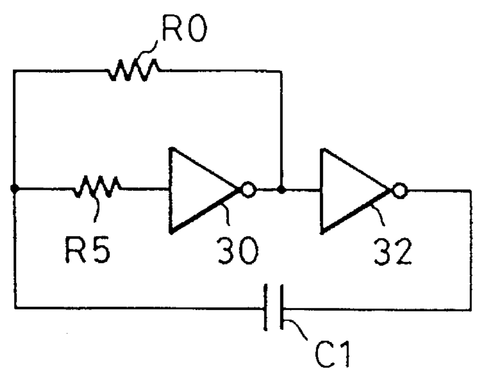
FIG. 4A is a circuit diagram showing a basic form of oscillation means 14 of FIG. 2.
Figure 4B:
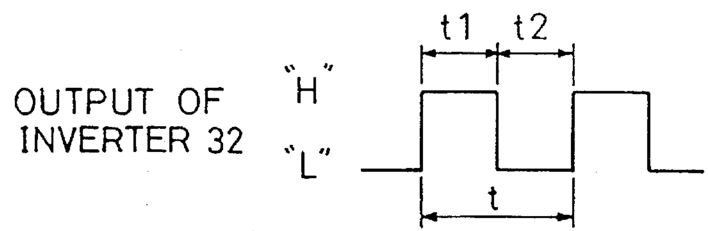
FIG. 4B is a waveform diagram showing an oscillation signal.

In FIG. 2, the oscillation circuit 14 has inversion period control circuit 16 in its feedback loop. There are provided a surrounding light quantity detection circuit 10 and a rear light quantity detection circuit 12 in the inversion period control circuit 16. The basic type of the oscillation circuit 14 is shown in FIG. 4A. Two inverters 30 and 32 are connected in series to each other and a series circuit of resistance R0 and a capacitor C1 is connected between the output terminal of the inverter 30 and the output terminal of the inverter 32. Junction between the resistance R0 and the capacitor C1 is connected to the input terminal of the inverter 30 through resistance RS. In this circuit, the capacitor C1 is charged with time constant of C1. When voltage of the capacitor C1 exceeds the threshold level of the inverter 30, the outputs of the inverters 30 and 32 are inverted. This operation is repeated and oscillation is thereby performed. An oscillation signal generated by the inverter 32 by this oscillation is shown in FIG. 4B in which its oscillation period t is obtained by $t=2.2R0\cdot C1$. In case the inverters 30 and 32 are constructed of CMOS integrated circuits, ratio t1:t2 of duration of the "H" level and the "L" level of this oscillation signal is about 1:1.

Figure 5A:
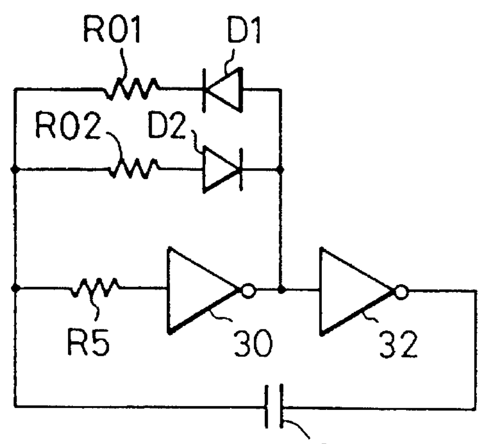
FIG. 5A is a circuit diagram showing the oscillation means 14 and a variable duty factor theory.
Figure 5B:
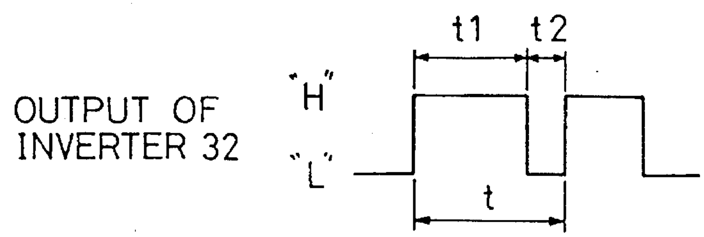
FIG. 5B is a waveform diagram showing an oscillation signal.

If, as shown in FIG. 5A, a series circuit of resistance R01 and a diode D1 and a series circuit of resistance R02 and a diode D2 (disposed in reverse direction to D1) are connected instead of the resistance R0 of FIG. 4A, the route of charged current is switched by the direction of charging of the capacitor C1. Therefore, as shown in FIG. 5B, duration t1 of "H" level and duration t2 of "L" level in the output pulse of the inverter 32 become respectively $$t1=R02\cdot C1\text{x}1.1 \text{ s}$$

$$t2=R01\cdot C1\text{x}1.1 \text{ s}$$

so that values of t1 and t2 can be individually adjusted by controlling values of the resistances R01 and R02.

The oscillation circuit 14 of FIG. 2 utilizes the above described operation. More specifically, the inversion period control circuit 16 of the oscillation circuit 14 includes a color imparting side pulse generation section 16*a* and a color fading side pulse generation section 16*b*. The color imparting side pulse generation section 16*a* includes CdS 10 constituting surrounding light detection circuit, resistance R1 and a diode D1 connected in series to this CdS 10 and resistance R2 connected in parallel to the CdS 10. The color fading side pulse generation section 16*b* includes CdS 12 constituting rear light detection circuit, resistance R3 and a diode D3 connected in series to this CdS 12 and resistance R4 connected in parallel to the CdS 12.

Figure 6:
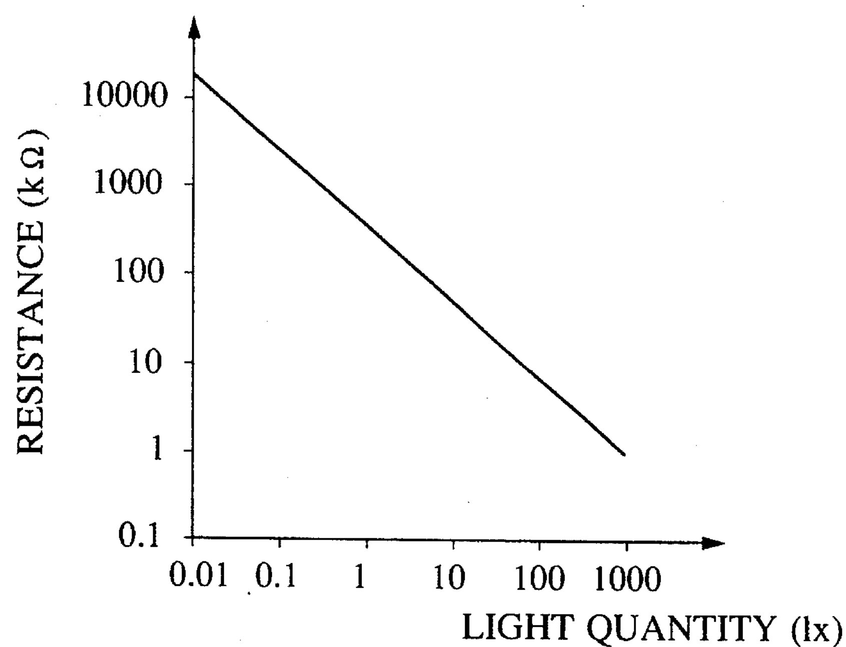
FIG. 6 is a diagram showing characteristic of CdS.
Figure 7:
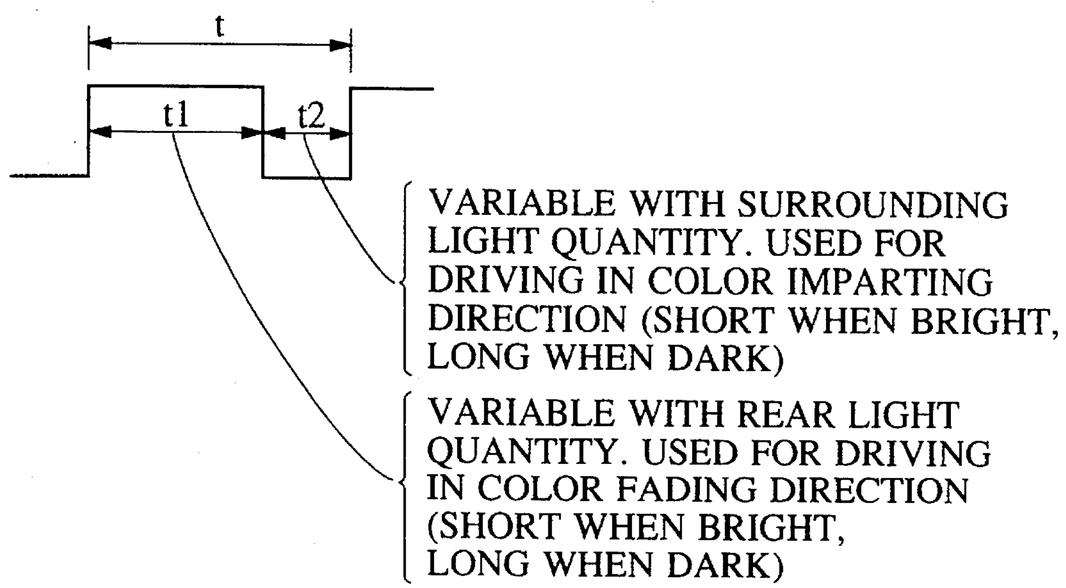
FIG. 7 is a waveform diagram showing an oscillation output of the oscillation means of FIG. 2.
Figure 8A:
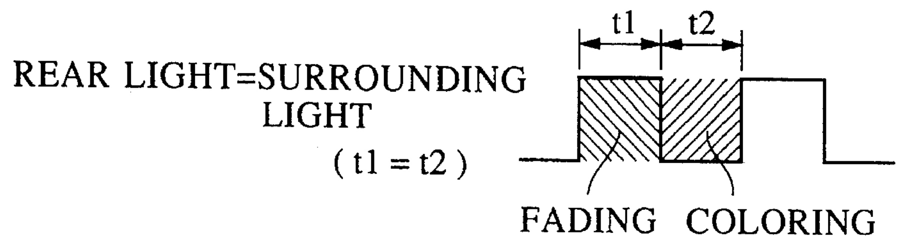
FIGS. 8A to 8C are waveform diagrams showing change in the oscillation output of the oscillation means 14 of FIG. 2 due to relation between surrounding light and rear light.
Figure 8B:
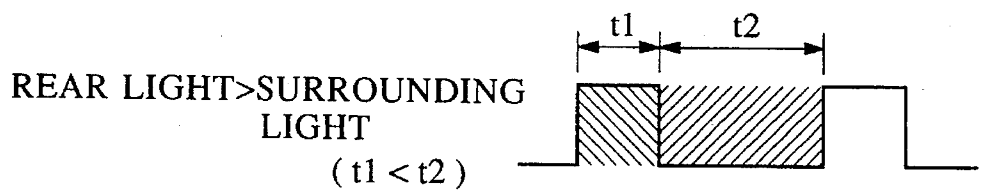
Figure 8C:
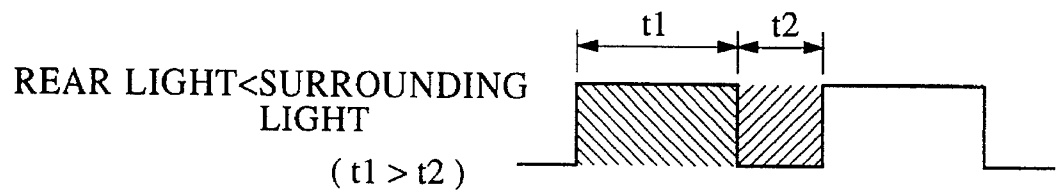

Since CdS has a characteristic which resembles a visible ray range of the human eye, it is the most suitable material as a photoconductive cell used as the surrounding light detection circuit and the rear light detection circuit in this invention. Characteristic of CdS is shown in FIG. 6. According to this diagram, CdS has a characteristic according to which resistance decreases as quantity of light increases and resistance increases as quantity of light decreases. Therefore, in the oscillation signal generated by the oscillation circuit 14 of FIG. 2, as shown in FIG. 7, the period t1 of "H" level changes in response to rear light quantity (i.e., the period becomes shorter as light quantity increases, that is, as it becomes brighter) and the period t2 of "L" level changes in response to surrounding light quantity (i.e., the period becomes shorter as light quantity increases, that is, as it becomes brighter). When the surrounding light quantity and the rear light quantity are equal to each other, t1 becomes equal to t2 as shown in FIG. 8A. When the surrounding light quantity is smaller than the rear light quantity, t1 becomes smaller than t2 as shown in FIG. 8B. When the surrounding light quantity is larger than the rear light quantity, t1 becomes larger than t2 as shown in FIG. 8C. As will be described later, color fading energy is supplied to the EC element 20 during the period t1 and color imparting energy is supplied to the EC element 20 during the period t2 and, accordingly, a color imparting tendency appears when t1 is smaller than t2 and a color fading tendency appears when t1 is larger than t2.

Figure 9:
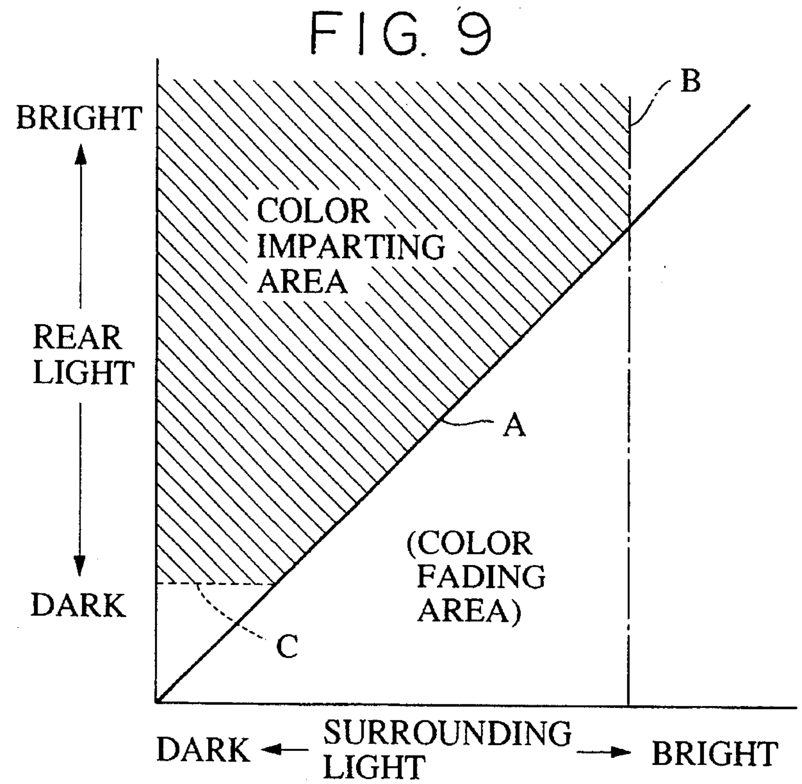
FIG. 9 is a diagram showing an ideal division to a color imparting area and a color fading area due to between surrounding light and rear light.

If, in controlling the amount of coloration in accordance with relation between surrounding light quantity and rear light quantity, division of a color imparting area and a color fading area is made along a solid line A in FIG. 9, there will arise a case where, when the surrounding light is strong (e.g., 5 to 30 lx or over) color is imparted if the rear light is strong notwithstanding that there is no need for coloration. Therefore, it is desirable that, when it is bright with the surrounding light being stronger than a predetermined value, this area should be made a color fading area as shown by a chain-and-dot line B regardless of the rear light quantity. Further, according to the division of area by the solid line A, there will arise a case where, when the surrounding light is very weak (e.g., 0.02 lx or below), even a very weak light from the rear will cause coloration. Therefore, it is desirable that, when it is dark with the surrounding light being below a predetermined value, this area below the predetermined value should be made a color fading area as shown by a dotted line C in FIG. 9.

The resistances R1 and R3 connected in series to the CdS 10 and 12 in FIG. 2 are provided for performing the function of the chain-and-dot line B in FIG. 9 and the resistances R2 and R4 connected in parallel to the CdS 10 and 12 are provided for performing the function of the dotted line C in FIG. 9. More specifically, the periods t1 and t2 of "H" and "L" levels of the oscillation output of the oscillation circuit 14 of FIG. 2 are expressed in the following manner:

$$t1=\{(R4\cdot r12)/(R4+r12)+R3\}\cdot C1x1.1 \quad (1)$$

$$t2=\{(R2\cdot r10)/(R2+r10)+Rlx)\cdot C1x1.1 \quad (2)$$

where r10 represents resistance value of CdS 10 and r12 represents resistance value of CdS 12.

Figure 10:
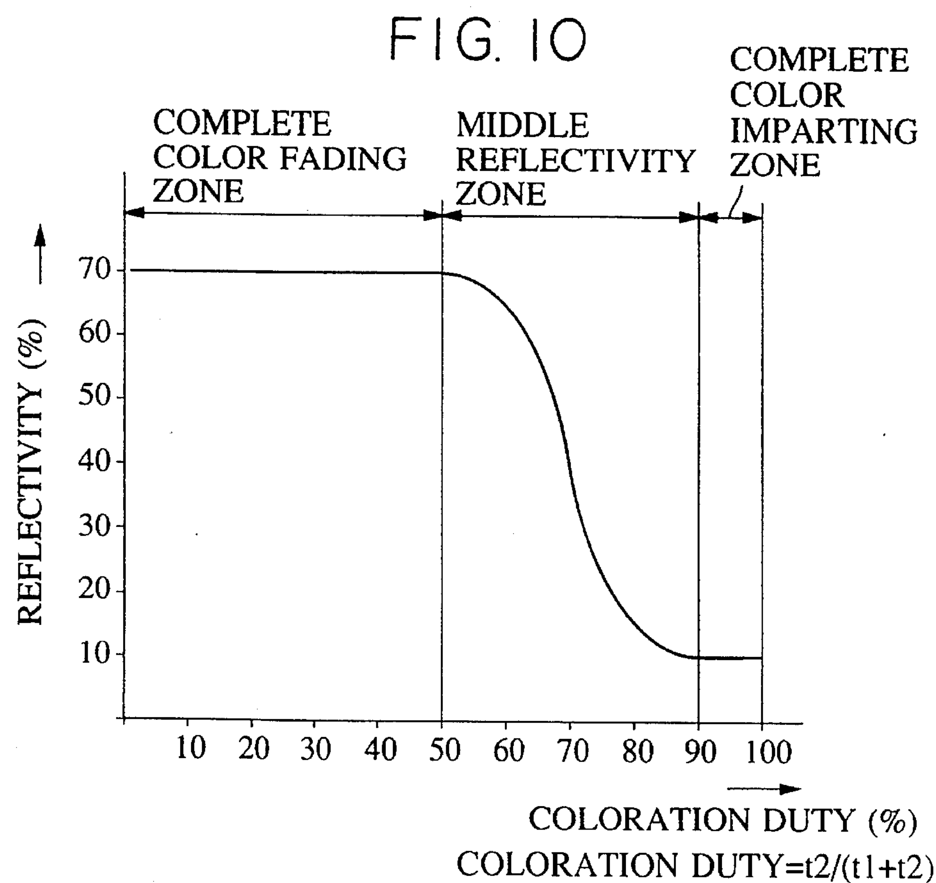
FIG. 10 is a characteristic diagram showing an example of mirror reflectivity change to coloration duty of drive voltage in the EC antiglare mirror.

According to the equation (2), resistance value r10 of CdS 10 decreases as the surrounding light becomes stronger (see FIG. 6) and, therefore, the color imparting energy supply period t2 is shortened. However, since there is the resistance R1, the decreasing tendency of the period t2 is weakened as the surrounding light becomes stronger than a certain value. Further, according to the equation (1), resistance value r12 of CdS 12 decreases as the rear light becomes stronger and, therefore, the color fading energy supply period t1 is shortened. However, since there is the resistance R3, the decreasing tendency of the period t1 is weakened as the rear light becomes stronger than a certain value. Consequently, in an area where both the surrounding light and the rear light are strong, the duty factor of the oscillation signal becomes stable at about 50% and difference between the color imparting energy and the color fading energy becomes small. Assuming now that characteristic of reflectivity of the EC antiglare mirror is as shown in FIG. 10, a high reflectivity characteristic is realized at the duty factor of about 50% and a color faded state thereby is maintained.

On the other hand, according to the equation (2), resistance value r10 of the CdS 10 increases as the surrounding light becomes weaker and, therefore, the color imparting energy supply period t2 is prolonged. Since, however, there is the resistance R2, the increasing tendency of the period t2 is weakened when the surrounding light becomes weaker than a certain value. Further, according to the equation (1), resistance value r12 of the CdS 12 increases as the rear light becomes weaker and, therefore, the color fading energy supply period t1 is prolonged. Since, however, there is the resistance R4, the increasing tendency of the period t1 is weakened when the rear light becomes weaker than a certain value. Consequently, in an area where both the surrounding light and the rear light are weak, the duty factor of the oscillation signal becomes stable at about 50% and difference between the color imparting energy and the color fading energy thereby becomes small. Consequently, the EC antiglare mirror becomes of a substantially high reflectivity characteristic and the color faded state thereby is maintained.

Figure 11:
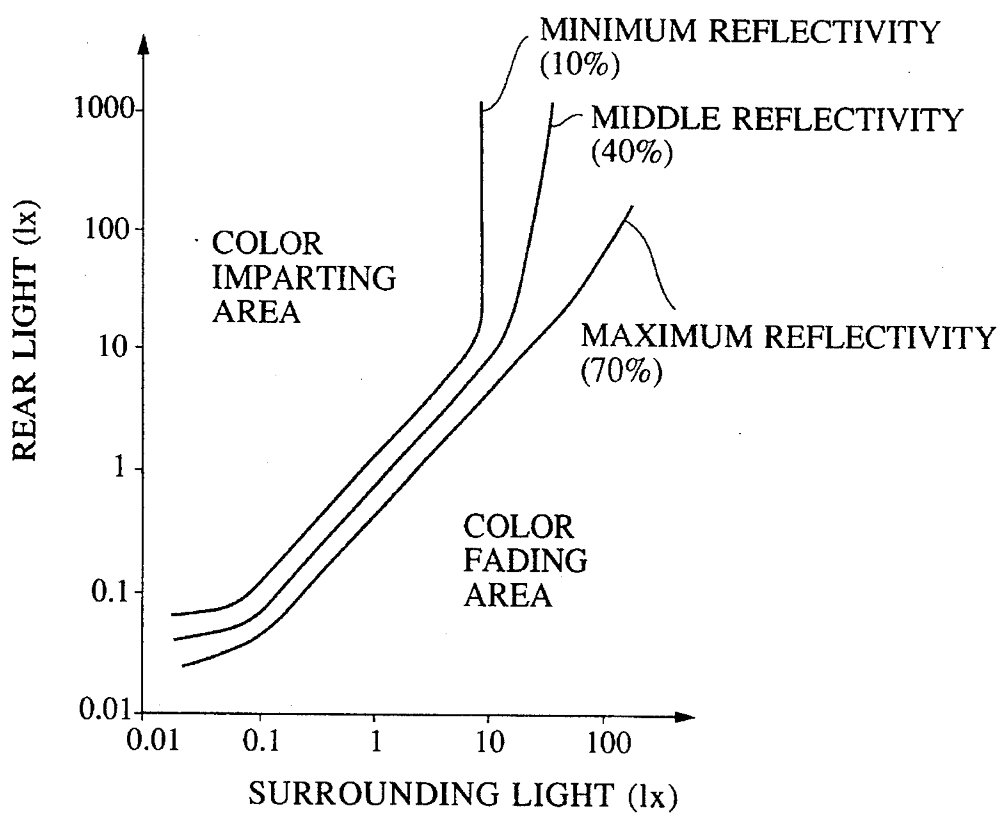
FIG. 11 is a graph showing change of the mirror reflectivity due to relation between surrounding light and rear light by the drive device of FIG. 2.

By the above described operation of the oscillation circuit 14, the EC antiglare mirror acquires a characteristic according to which reflectivity changes as shown in FIG. 11 depending upon the surrounding light and the rear light. In the example of FIG. 11, the color fading tendency is set to be imparted in areas where both the surrounding light and the rear light are above 10 lx and below 0.02 lx. By such setting, when the surrounding light is strong, color is not imparted even if a succeeding vehicle approaches with its headlight on (in this situation, the driver does not feel the glare of the light). Further, when the surrounding is very dark, color is not imparted even if headlight of a very far succeeding vehicle is received. For realizing the characteristic of FIG. 11 when the characteristics of CdS 10 and CdS 12 are as shown in FIG. 6, values of the resistances R1 and RS may be set at values in the vicinity of resistance values (several 10 kΩ of CdS 10 and CdS 12 at the light quantity of 10 lx and values of the resistances R2 and R4 may be set at values in the vicinity of resistance values (several 1000 kΩ or over) of CdS 10 and CdS 12 at the light quantity of 0.02 lx.

In FIG. 2, the oscillation circuit 14 produces oscillation signals having "H" level of about, +1.6V and "L" level of about −1.6V. A capacitor C4 is provided for preventing occurrence of noise on the power supply line). The EC element drive circuit 24 has two switching transistors Q1 and Q2 which are complementary push-pull connected between positive and negative power source voltages of about +1.6V and −1.6V. Resistances R6 and R7 are connected in series between the power supply line of about +1.6V and the output terminal of the oscillation circuit 14 and voltage at the junction of the resistances R6 and R7 is applied to the base of the transistor Q1. Resistances R8 and R9 are connected in series between the power supply line of about −1.6V and the output terminal of the oscillation circuit 14 and voltage at the junction of the resistances R8 and R9 is applied to the base of the transistor Q2. By adopting this construction, when the output of the oscillation circuit 14 is at the "H" level, the transistor Q1 is turned off and the transistor Q2 is turned on thereby supplying energy in the color fading direction to the EC element 20. When the output of the oscillation circuit 14 is at the "L" level, the transistor Q1 is turned on and the transistor Q2 is turned off thereby supplying energy in the color imparting direction to the EC element 20. Since resistances R10 and R11 which constitute energy supply restricting elements are connected in series to the transistors Q1 and Q2, supply of energy (supply of current) in the color imparting and color fading directions is restricted whereby power consumption and heating of the EC element 20 are restricted. Since the EC element 20 is electrically the same as capacity, time constant circuits are established with the resistances R10 and R11 (R10 and R11 are respectively 5Ω) whereby speed of response in color imparting and color fading is reduced. Accordingly, while running at night, too frequent repetition of coloration and color fading which is caused by street lights, shop lights and headlights of vehicles running on the opposite lane and is rather irritating to the human sense can be effectively prevented.

Figure 12:
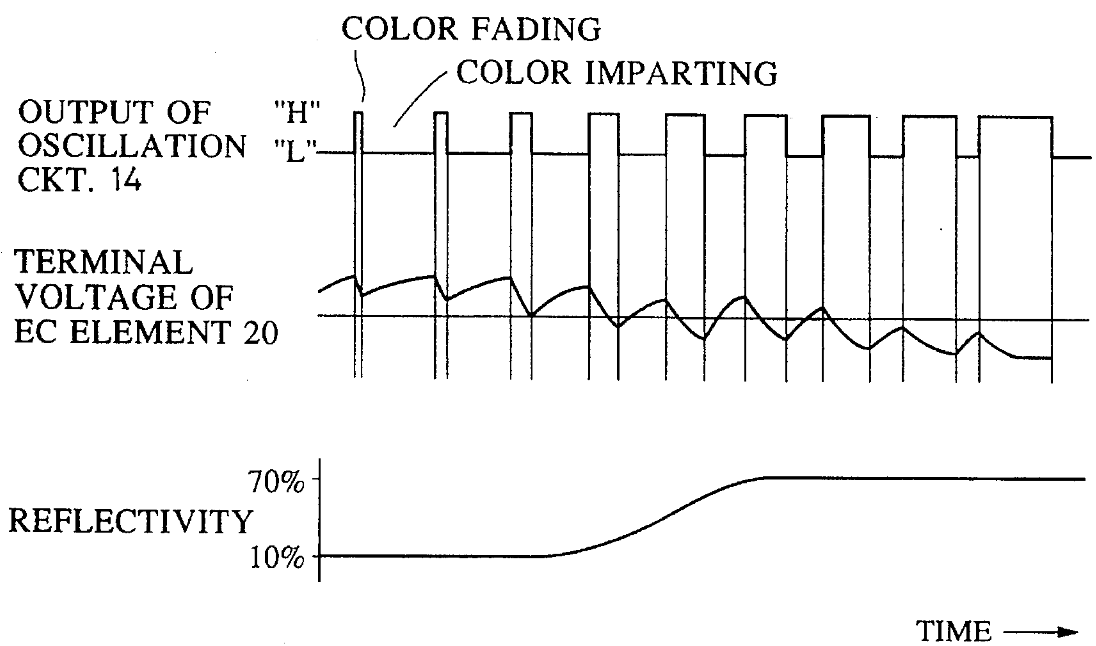
FIG. 12 is a waveform diagram showing an example of operation of the drive device of FIG. 2.

FIG. 12 shows an example of the operation of the drive device of FIG. 2. In this example, reflectivity gradually rises from a low state. Since the EC element 20 constitutes a time constant circuit with the resistances R10 and R11, terminal voltage of the EC element 20 assumes an integrated waveform.

In FIG. 2, a switch SW1 is provided for fixing the output level of the oscillation circuit 14 compulsorily to the color fading mode by operation of the driver. When the switch SW1 is turned on, the oscillation circuit 14 stops oscillation because voltage on the input side of the inverter 30 is fixed to "H" level and, accordingly, the output level of the oscillation circuit 14 is fixed to "H" level. The transistor Q1 therefore is fixed to the off state and the transistor Q2 to the on state and the EC element 20 is brought into the color fading mode.

What is claimed is:

1. A device for driving an EC antiglare mirror in which reflectivity is variably controlled by an EC element comprising:

surrounding light quantity detection means for detecting quantity of light surrounding a vehicle;

rear light quantity detection means for detecting quantity of light in the rear of the vehicle;

oscillation means for generating an oscillation signal of an "H" level and an oscillation signal of an "L" level repeatedly and alternately, said oscillation means being capable of individually controlling duration of the "H" level and duration of the "L" level;

inversion period control means for variably controlling duration of one of the "H" and "L" levels of the oscillation signal generated by said oscillation means in response to light quantity detected by said surrounding light quantity detection means and variably controlling duration of the other of the "H" and "L" levels of the oscillation signal in response to light quantity detected by said rear light quantity detection means;

a drive power source for driving the EC element; and

EC element drive means for inverting the polarity of drive voltage supplied from the drive power source in response to the "H" or "L" level of the oscillation signal generated by said oscillation means and applying the inverted drive voltage to the EC element, said inversion period control means performs control, when said EC element drive means is so set that it drives the EC element in a color imparting direction at the one level of the oscillation signal and in a color fading direction at the other level of the oscillation signal, in such a manner that, when the surrounding light quantity is larger, the duration of the one level is shorter and, when the surrounding light quantity is smaller, the duration of the one level is longer and that, when the rear light quantity is larger, the duration of the other level is shorter and, when the rear light quantity is smaller, the duration of the other level is larger and, when said EC element drive means is so set that it drives the EC element in a color fading direction at the one level of the oscillation signal and in a color imparting direction at the other level of the oscillation signal, in such a manner that, when the surrounding light quantity is larger, the duration of the one level is longer and, When the surrounding light quantity is smaller, the duration of the one level is shorter and that, when the rear light quantity is larger, the duration of the other level is longer and, when the rear light quantity is smaller, the duration of the other level is shorter.

2. A device for driving an EC antiglare mirror in which reflectivity is variably controlled by an EC element comprising:

oscillation means comprising first inversion period control means including a first photoconductive cell which receives light surrounding a vehicle and decreases its value of resistance in response to quantity of the surrounding light, first resistance and a first diode connected in series to the first photoconductive cell, and second resistance connected in parallel to the first photoconductive cell, and second inversion period control means including a second photoconductive cell which receives light in the rear of the vehicle and decreases its value of resistance in response to quantity of the rear light, third resistance and a second diode having a direction reverse to the first diode connected in series to the second photoconductive cell, and fourth resistance connected in parallel to the second photoconductive cell, said first inversion period control means and said second inversion period control means being arranged in parallel in a feedback loop, and, when the value of resistance of the first photoconductive cell decreases, duration of one of "H" and "L" levels of oscillation signals is shortened whereas, when the value of resistance of the second photoconductive cell decreases, duration of the other level of oscillation signals is shortened;

a drive power source for driving the EC element;

an EC element drive switching circuit which inverts the polarity of drive voltage supplied from the drive power source in accordance with the "H" or "L" level of the oscillation signal generated by the oscillation means and applies the inverted voltage to the EC element, said switching circuit applying voltage of a color imparting direction when the oscillation signal is at the one level and applying voltage of a color fading direction when the oscillation signal is at the other level.

3. A device for driving an EC antiglare mirror as defined in claim 2 wherein the EC element drive switching circuit comprises a switching element and which further comprises an energy supply restricting element which is connected in series to the switching element for restricting supply of driving energy to the EC element.

4. A device for driving an EC antiglare mirror as defined in claim 1 wherein the oscillation period of the oscillation means is 10 ms or below.

5. A device for driving an EC antiglare mirror as defined in claim 1 which further comprises oscillation stop means for stopping oscillation of the oscillation means through an outside operation to fix an output level of the oscillation means to a level at which the voltage of a color fading direction is applied to the EC element.

* * * * *